United States Patent [19]

Niyada et al.

[11] Patent Number: 4,736,429

[45] Date of Patent: Apr. 5, 1988

[54] APPARATUS FOR SPEECH RECOGNITION

[75] Inventors: Katsuyuki Niyada, Sagamihara; Ikuo Inoue, Yokohama; Satoru Fujii, Sagamihara; Shuji Morii, Tokyo, all of Japan

[73] Assignee: Matsushita Electric Industrial Co., Ltd., Japan

[21] Appl. No.: 618,368

[22] Filed: Jun. 7, 1984

[30] Foreign Application Priority Data

Jun. 7, 1983 [JP] Japan ............................. 58-102023

[51] Int. Cl.⁴ .......................................... G10L 5/00
[52] U.S. Cl. .......................................... 381/43
[58] Field of Search ........................ 381/41–43; 364/513.5

[56] References Cited

PUBLICATIONS

Systems–Computers–Controls, vol. 10, No. 1, Jan./Feb. 1979, pp. 17–26, Silver Spring, Md., USA; Y. Niitsu et al.: "A method of Using Linguistic Information for Automatic Spoken Word Recognition".

IEEE Transactions on Electronic Computers, vol. EC-12, No. 5, Dec. 1963, pp. 835–846, New York, USA; T. Sakai et al.: "The Automatic Speech Recognition System for Conversational Sound".

Proceedings of the Fourth International Joint Conference on Pattern Recognition, Kyoto, 7th-10th, Nov. 1978, pp. 985–989, IEEE, New York, USA; Sei-Ichi Nakagawa et al.: "A Real Time Spoken Word Recognition System in a Large Vocabulary with Learning Capability of Speaker Differences".

ICASSP 81 (IEEE International Conference on Acoustics, Speech and Signal Processing), Atlanta, 30th Mar.-1st Apr. 1981, pp. 1156–1159, IEEE, New York, USA; M. Wagner: "Automatic Labelling of Continuous Speech with a Given Phonetic Transcription Using Dynamic Programming Algorithms".

IEEE Transactions on Acoustics, Speech and Signal Processing, vol. ASSP-27, No. 5, Oct. 1979, pp. 538–549, New York, USA; R. DeMori et al.: "Interference of a Knowledge Source for the Recognition of Nasals in Continuous Speech".

IEEE Transactions on Acoustics, Speech and Signal Processing, vol. ASSP-23, No. 1, Feb. 1975, pp. 54–67, New York, USA; C. J. Weinstein et al.: "A System for Acoustic-Phonetic Analysis of Continuous Speech".

1978 IEEE Internation Conference on Acoustics, Speech and Signal Processing, Tulsa, 10th–12th Apr. 1978, pp. 728–730, IEEE, New York, USA; Sei-Ichi Nakagawa et al.: "A Word Recognition Method from a Classified Phoneme String in the Lithan Speech Understanding System".

Primary Examiner—Emanuel S. Kemeny
Attorney, Agent, or Firm—Lowe, Price, LeBlanc, Becker & Shur

[57] ABSTRACT

Apparatus for speech recognition, having each phoneme as a fundamental recognition unit, recognizes input speech by discriminating phonemes in the input speech. The apparatus comprises a memory for storing phoneme standard patterns of phonemes or phoneme groups; a spectrum analyzer for obtaining parameters indicative of the input speech signal spectrum; a statistical distance measure similarity calculator calculates the degree of similarity between the output of the spectrum analyzer and standard patterns stored in the memory; a segmentation portion for segmenting by using time-dependent low- and high-frequency power variations of the input speech signal and results from the similarity calculator; and a phoneme discriminator for recognizing phonemes by using the results from the similarity calculator.

26 Claims, 13 Drawing Sheets

| FRAME NO. | 1 | 2 | 3 | 4 | 5 | 6 | 7 | 8 | 9 | 10 | 11 | 12 | 13 | 14 | 15 | 16 | 17 | 18 | 19 | .... |
|---|---|---|---|---|---|---|---|---|---|---|---|---|---|---|---|---|---|---|---|---|
| HIGHEST SIMILARITY | A | A | A | A | A | O | O | O | O | O | N | N | N | U | N | N | U | U | U | |
| SECOND HIGHEST SIMILARITY | E | O | O | O | O | A | A | A | N | N | O | O | U | N | U | U | N | N | N | |
| PERIOD | ←——————— VOWEL ———————→ | | | | | | | | | | ←— CONSONANT —→ | | | | | | ←— VOWEL | | | |
| PHONEME | ←— /a/ —→ | | | | | ←— /o/ —→ | | | | | | | | | | | ←— /u/ | | | |

| FRAME NO. | 1 | 2 | 3 | 4 | 5 | 6 | 7 | 8 | 9 |
|---|---|---|---|---|---|---|---|---|---|
| HIGHEST SIMILARITY PHONEME STRING | N | N | N | U | N | A | A | A | A |
| SECOND HIGHEST SIMILARITY PHONEME STRING | I | I | U | N | U | O | O | O | O |

WORD BEGINNING CONSONANT

|← PROPOSED SEMIVOWEL /j/ PERIOD →|← FOLLOWING VOWEL PERIOD →|

|← PROPOSED SEMI-VOWEL /w/ PERIOD →|

70 → W W W W W W W W

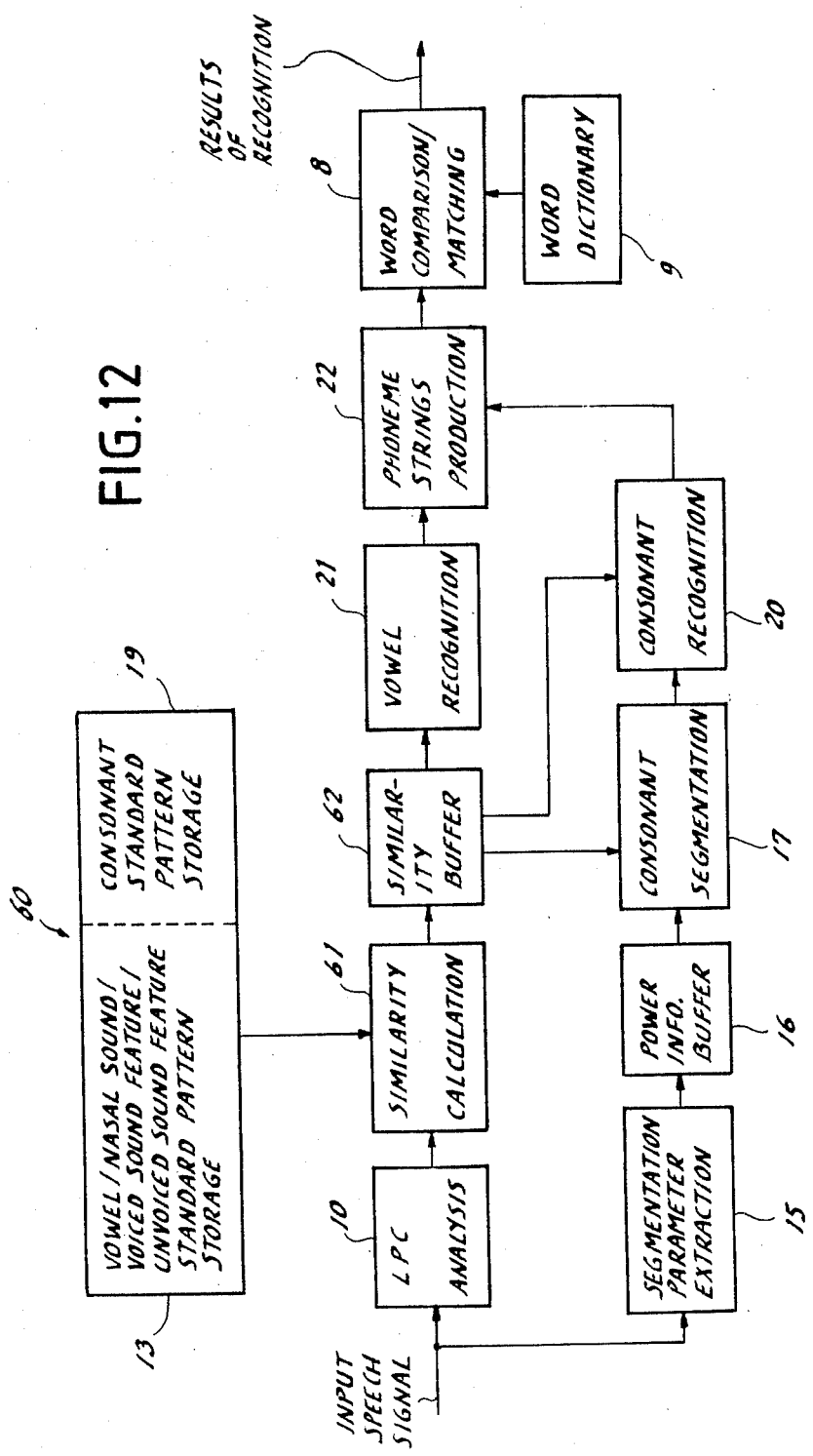

APPARATUS FOR SPEECH RECOGNITION

BACKGROUND OF THE INVENTION

This invention relates generally to apparatus for speech recognition, and more particularly to such apparatus which recognizes speech by discriminating phonemes.

In some conventional speech recognition apparatus, a spectrum analyzing portion comprising a filter bank of 29 channels is used to convert an input speech signal into power values of consecutive frames each having a time length of 10 msec or so, so that 29-channel band power level values are obtained. Then local peaks are extracted from the band power levels by way of a local peak extracting portion so as to obtain three values P1, P2, P3 in opposite order of frequency and another three values Pe1, Pe2, Pe3 in order of power for each frame. On the other hand, a segmentation parameter extracting portion is used to extract overall frequency range power, slope of spectrum, low-frequency range and middle-frequency range moments for each frame by using the band power information. Then a segmentation portion determines vowel periods, consonant periods and semivowel periods by using time-dependent variation of parameters obtained by the segmentation parameter extracting portion. A phoneme discriminating portion discriminates phonemes by using the local peak obtained by the local peak extracting portion for respective periods determined by the segmentation portion. Such phoneme discrimination is effected by applying the position of a local peak to a discriminant diagram which is prestored in a discriminant storing portion in advance. Discriminant diagrams are prepared separately for vowels, consonants and semivowels, and one of them is selected by the segmentation portion. The abovementioned P1, P2, P3 values are used for vowels and semivowels, while the Pe1, Pe2, Pe3 values are used for consonants.

A phoneme string producing portion puts the results of phoneme discrimination obtained by the phoneme discrimination portion of respective frames together for respective segmentation periods, and assigns phoneme symbols to respective periods. Segmentation is effected in accordance with the continuity of the results of phoneme discrimination for respective frames when vowels, such as /ao/, /iu/, continue because the segmentation portion cannot perform segmentation in connection with such continued vowels. In this way, the input speech signal is converted into phoneme strings.

A word matching portion then compares the input phoneme strings obtained in this way by the phoneme string producing portion with respective items of a word dictionary by time warping matching so as to output the item of the dictionary which is nearest to the input phoneme strings, as the result of recognition.

There are some phonemes which are difficult to detect by using segmentation parameters extracted by the segmentation parameter extracting portion; this is especially so for nasal sounds, "r" sound and semivowels. Since these phonemes have a high similarity to vowels, it is difficult to detect them by only such parameters.

Another drawback for the conventional technique is that the frame rate of phoneme recognition is low. In the conventional arrangement, the position of local peak is used as a feature parameter, and phoneme recognition is effected by applying the phoneme to discriminant diagrams. Although such method is expected to have a high discrimination rate for vowels and some semivowels, there is a limit on discrimination of consonants.

SUMMARY OF THE INVENTION

The present invention has been developed to remove the above-described drawbacks inherent in the conventional speech recognition apparatus.

It is, therefore, an object of the present invention to provide speech recognition apparatus having a high speech recognition rate.

In accordance with the present invention, there is provided a speech recognition apparatus, comprising: a spectrum analyzing portion for obtaining parameters indicative of the spectrum of an input speech signal; a standard pattern storing portion for storing phoneme standard patterns of phonemes or phoneme groups; a similarity calculating portion for calculating the degree of similarity between the results from said spectrum analyzing portion and standard patterns from said standard pattern storing portion by using a statistical distance measure; a segmentation portion for performing segmentation by using time-dependent variations of power information and the results from said similarity calculating portion with said power information being obtained in connection with both a low-frequency range spectrum and a high-frequency range spectrum of said input speech signal; and a phoneme discriminating portion for recognizing phonemes by using the results from said similarity calculating portion.

In accordance with the present invention, there is also provided speech recognition apparatus, comprising: a spectrum analyzing portion for obtaining spectrum information of an input speech signal; a first similarity calculation portion for obtaining the degree of similarity of said input speech signal to phonemes of features of vowels, voiced sounds and unvoiced sounds by calculating the degree of similarity between the results from said spectrum analyzing portion and standard patterns from a standard pattern storing portion; a first recognition portion for performing segmentation and recognition by using the continuity of the results from said first similarity calculation portion; a segmentation parameter extracting portion for obtaining low-frequency range power information and high-frequency range power information of said input speech signal; a consonant segmentation portion for performing consonant phoneme segmentation by using a time-dependent variation of said power information and the results from said first similarity calculation portion; a second similarity calculation portion for calculating the degree of similarity between coefficients from said spectrum analyzing portion and standard patterns of consonant phonemes from said standard pattern storing portion for periods obtained by said consonant segmentation portion; a second recognition portion for recognizing consonant phonemes on the basis of the results from said second similarity calculation portion; a phoneme string producing portion for producing phoneme strings by using the results from said first recognition portion and the results from said second recognition portion; and a matching portion for comparison/matching the results from said phoneme string producing portion and dictionary items included in a word dictionary to output the dictionary item having the highest similarity to said phoneme strings.

BRIEF DESCRIPTION OF THE DRAWINGS

The object and features of the present invention will become more readily apparent form the following detailed description of the preferred embodiments taken in conjunction with the accompanying drawings in which:

FIG. 11A is a diagram helpful in describing the method of detecting the semivowel /j/ according to the present invention;

FIG. 11B is a diagram helpful in describing the method of detecting the semivowel /w/ according to the present invention; and FIG. 12 is a functional block diagram of another embodiment of the speech recognition apparatus according to the present invention.

The same or corresponding elements and parts are designated with like reference numerals throughout the drawings.

DETAILED DESCRIPTION OF THE INVENTION

Figure 1:
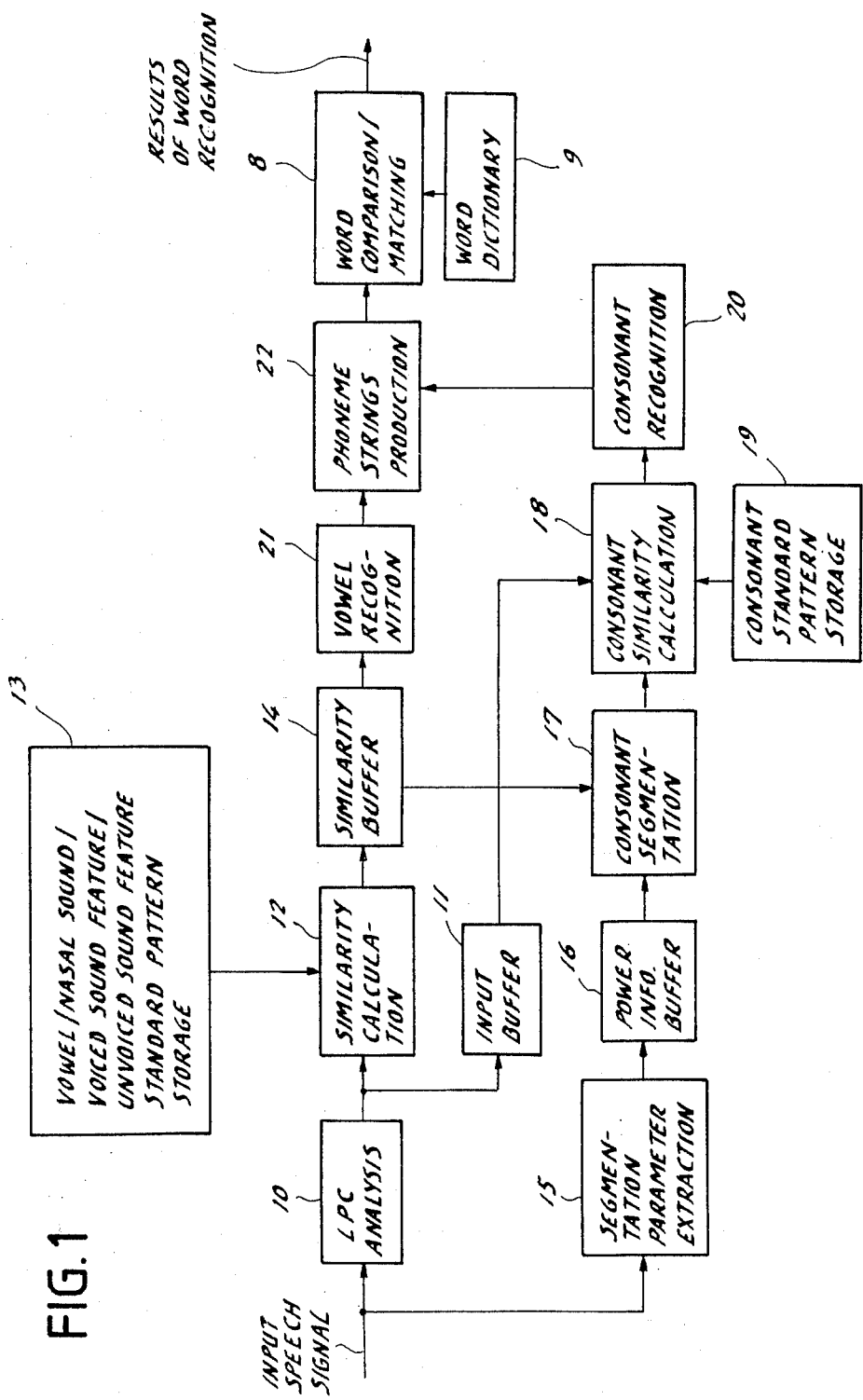
FIG. 1 is a functional block diagram of a speech recognition apparatus according to an embodiment of the present invention.
Figure 2A:
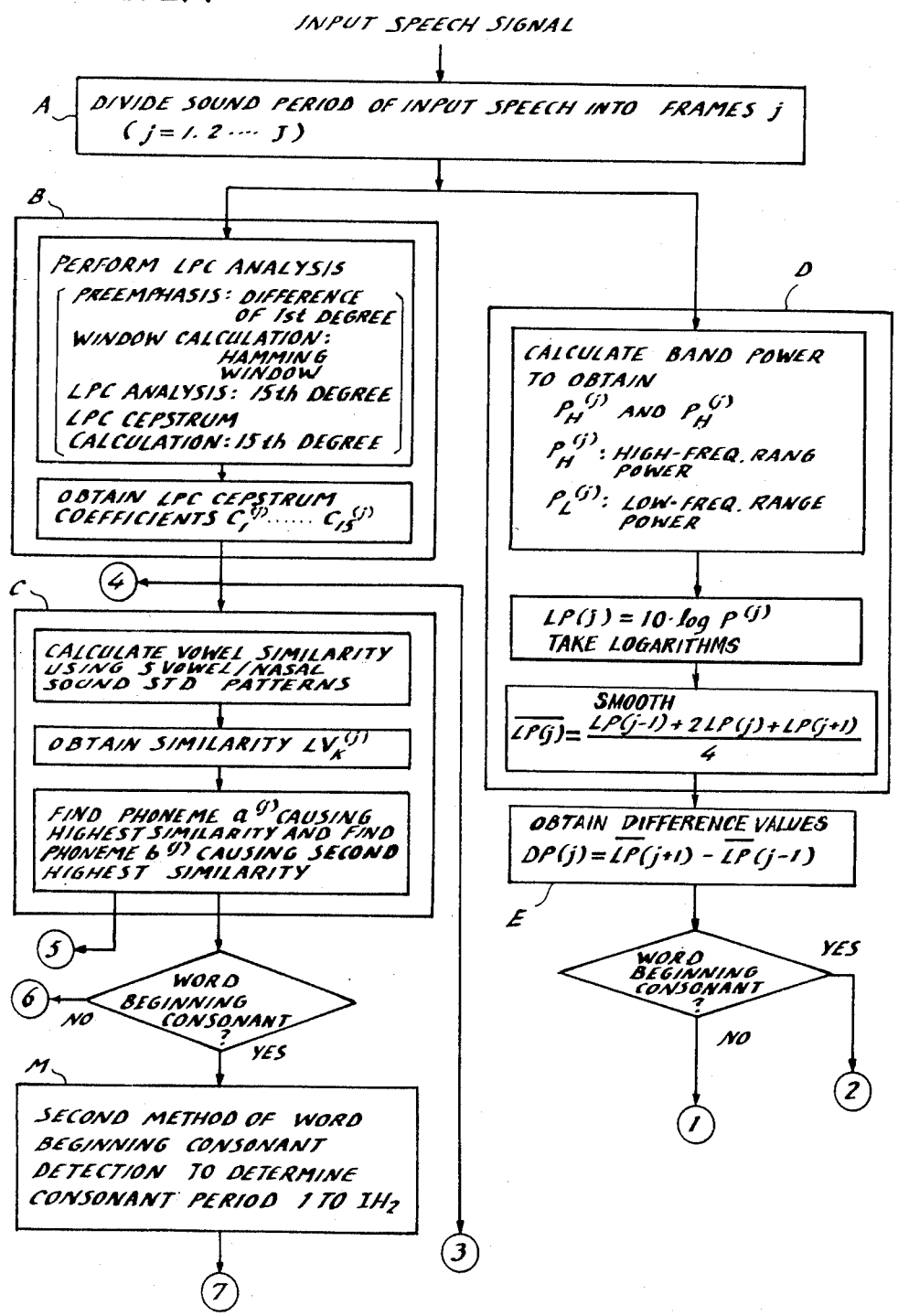
FIGS. 2A to 2E form a flowchart for the recognition method performed by the apparatus of FIG. 1.
Figure 2B:
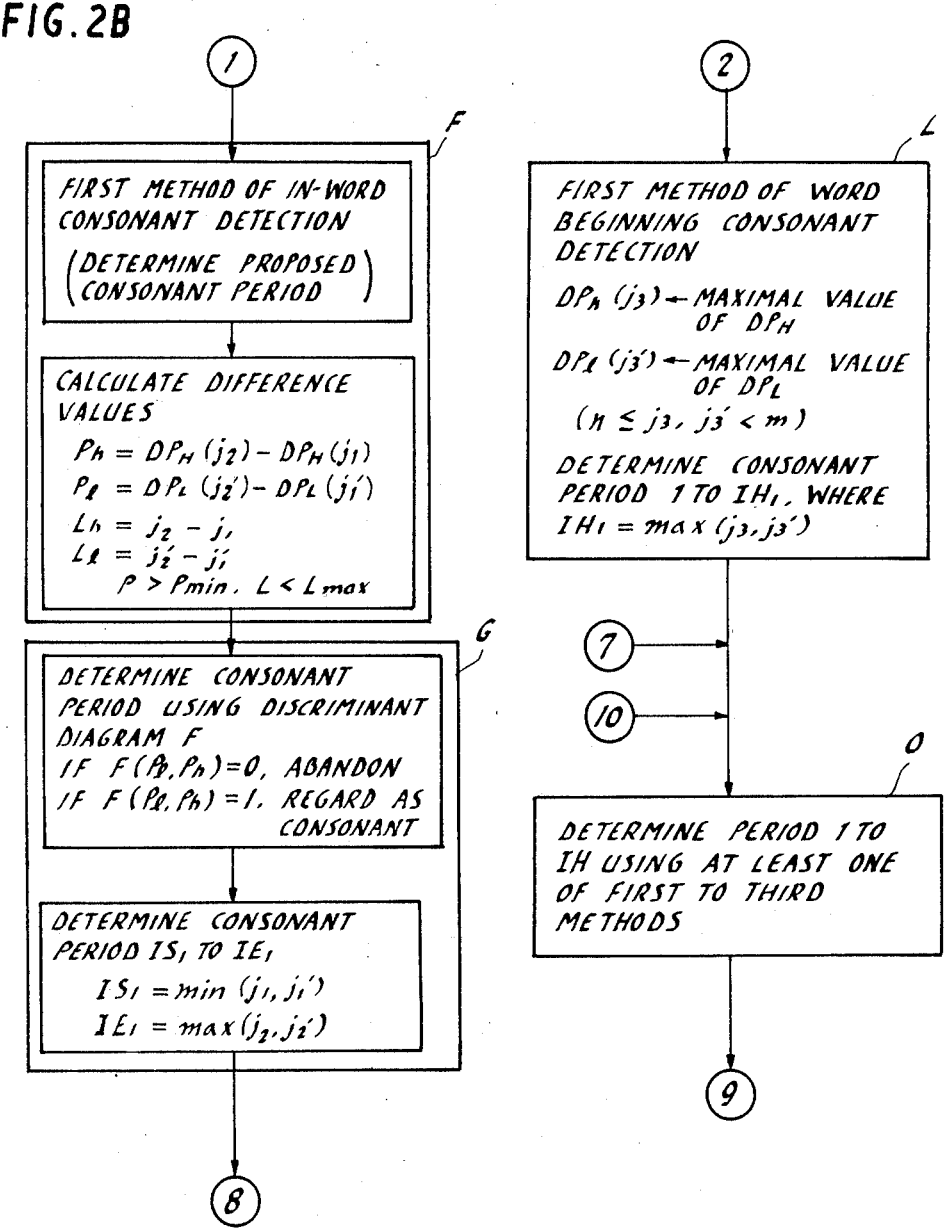
Figure 2C:
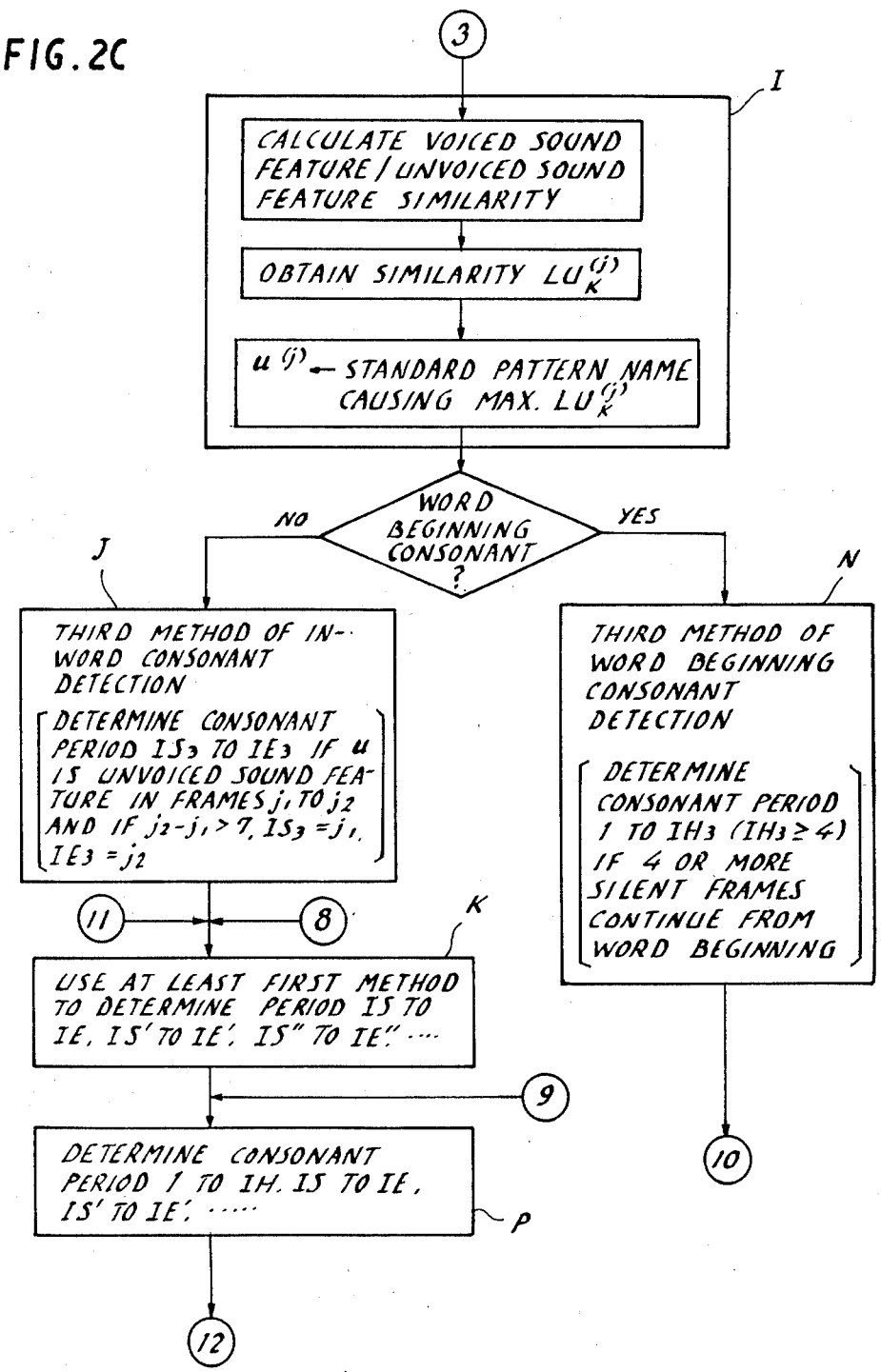
Figure 2D:
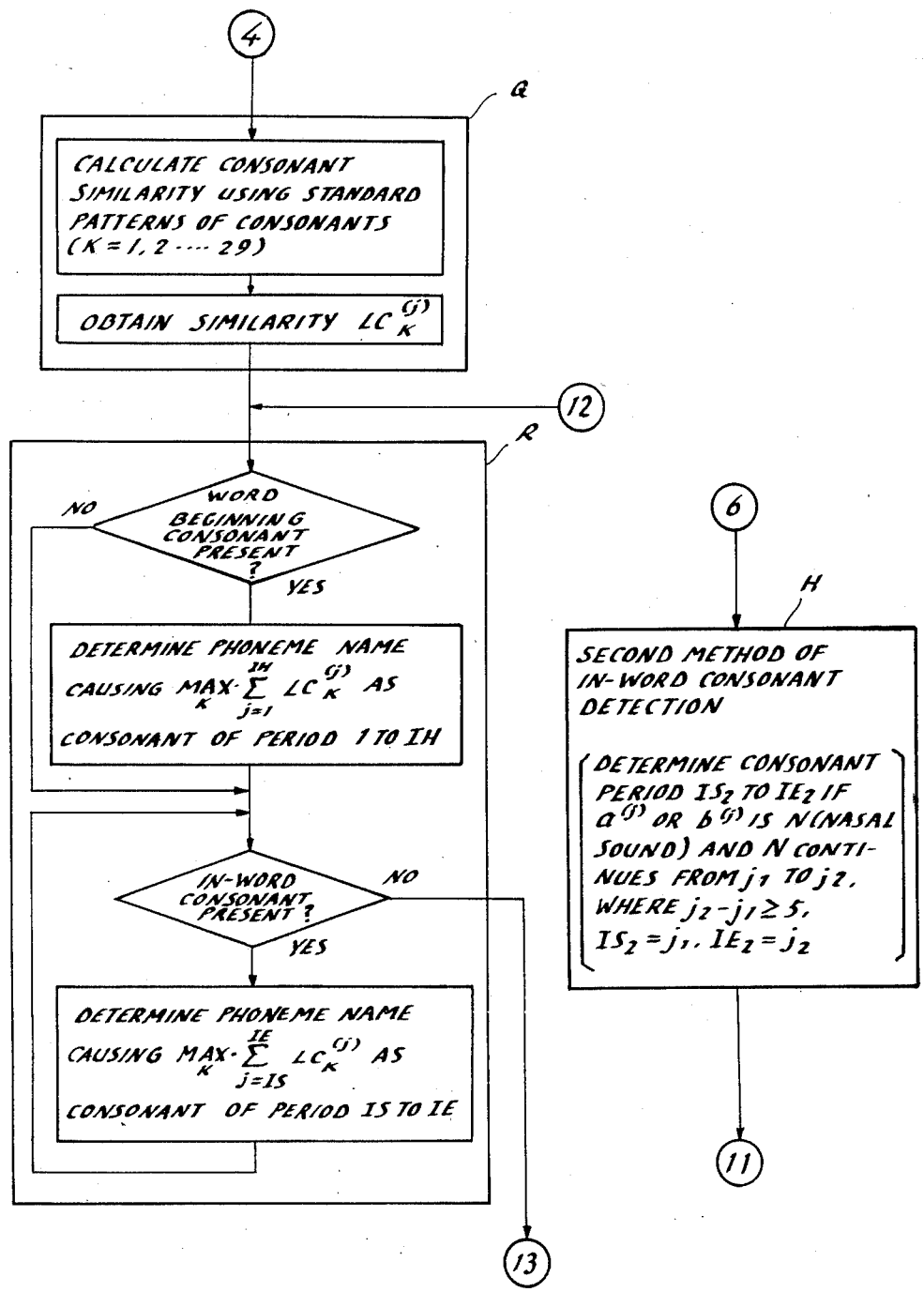
Figure 2E:
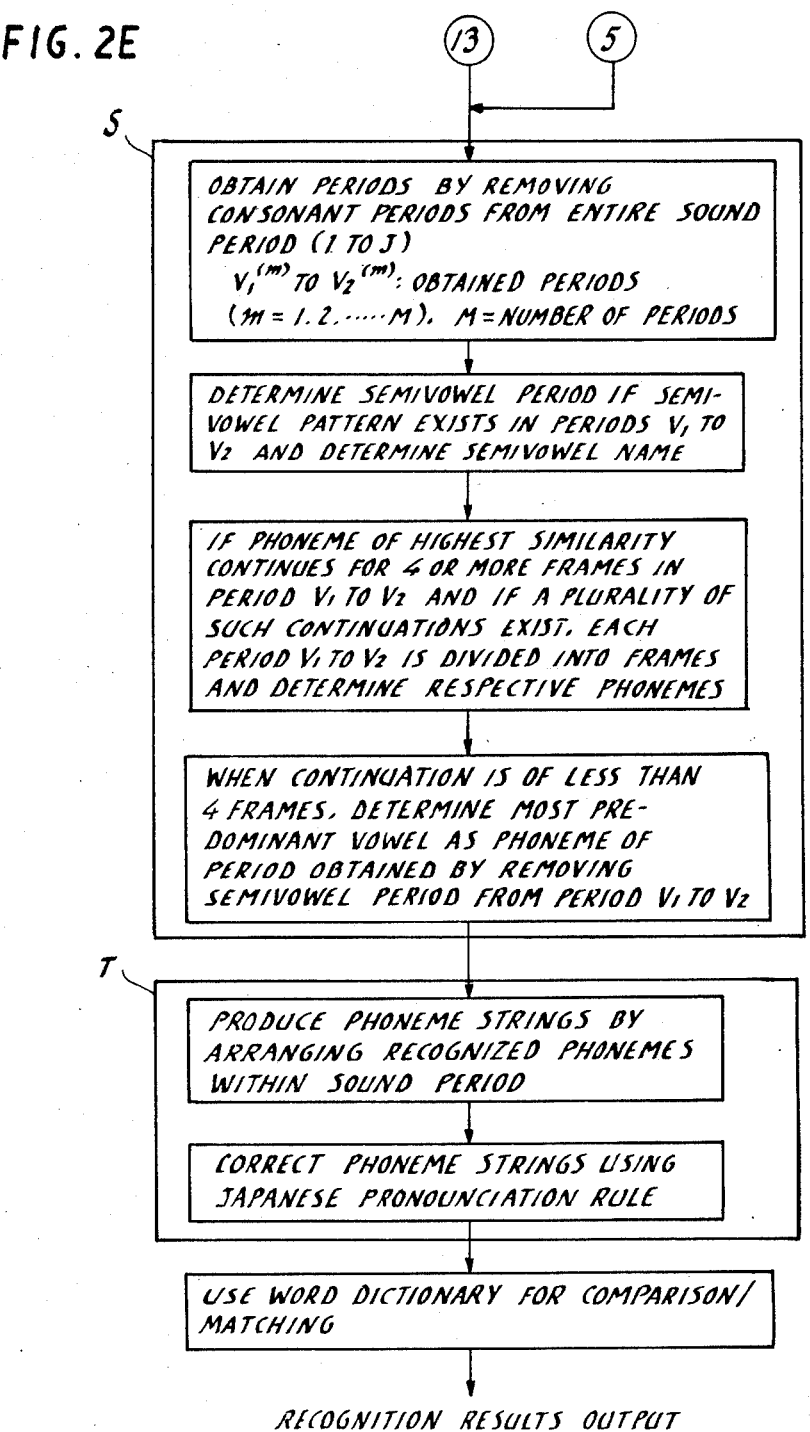

In FIG. 1 of the accompanying drawings is illustrated a functional block of an embodiment of the digital speech recognition apparatus according to the present invention. The speech recognition function according to the present invention is performed by one or more computers which execute a program shown in the flowchart in FIG. 2. Although FIG. 1 only includes blocks used for speech recognition, an analog input speech signal is converted into a digital signal by way of an A/D converter (not shown) so that the digital signal is fed to an input stage of the arrangement of FIG. 1.

As shown in the flowchart of FIG. 2, in a first step A, an input speech signal sound period is divided into 10 msec frames, expressed in terms of $j = 1, 2, \ldots J$. Then in a step B, pre-emphasis (first order difference) is performed on the input speech signal, and then a 20 msec Hamming window is performed. To these ends, 15th degree linear predictive coefficients (LPC) are obtained, and then 15th degree LPC cepstrum coefficients $C_n^{(j)}$ are obtained wherein $n = 1, 2, \ldots 15$. These operations are performed by an LPC analyzing portion 10 of FIG. 1. Such operations are described in detail in "LINEAR PREDICTION OF SPEECH" written by J. B. Marekl and A. H. Gray, Jr. (SPRINGER-VERLAG). The LPC cepstrum coefficients obtained for each 10 msec frame are fed in parallel to an input buffer 11 and to a similarity calculator 12. The similarity calculator 12 determines the degree of similarity $LV_k^{(j)}$ between input parameters $C_n^{(j)}$ and respective standard patterns of five vowels and nasal sounds stored in a vowel/nasal sound/voiced sound feature/unvoiced sound feature standard pattern memory 13. The similarity is determined by calculating the statistical distance between the patterns stored in memory 13 and the output of analyzer 10. The input parameters are then rearranged in order of degree of similarity as shown in a step C, FIG. 2. Then the rearranged results are fed on a frame-by-frame basis to a similarity buffer 14. The standard patterns are prepared in advance by using a number of data to obtain the average values and covariances for respective vowels and nasal sounds (/m/, /n/, syllabic nasal in Japanese).

The statistical distance can be derived from Bayes' discriminant, Mahalanobis' distance, the linear discriminant function and so on; satisfactory results are obtained in substantially the same manner no matter which one of these methods is used.

These statistical distance measuring techniques are briefly and generally described. Using $\mu_k$ and $\Sigma_k$ respectively for an average vector and a covariance matrix of a phoneme k, the probability density $P_k$ for the input $C = (C1, C2, \ldots Cd)$ is given by the following equation.

$$P_k = \frac{1}{(2\pi)^{\frac{d}{2}} |\Sigma_k|^{\frac{1}{2}}} \cdot \exp\{-\tfrac{1}{2}(C - \mu_k)^T \Sigma_k^{-1} (C - \mu_k)\} \quad \text{Eq. (1)}$$

wherein $|\Sigma_k|$ indicates the value of a matrix, while a superscript T represents transposition. The logarithm, $L_k$, of $P_k$ is:

$$L_k = -\tfrac{1}{2}(C - \mu_k)^T \cdot \Sigma_k^{-1} \cdot (C - \mu_k) - A_k \quad \text{Eq. (2)}$$

wherein $A_k = \log\{(2\pi)^{\frac{d}{2}} \cdot |\Sigma_k|^{\frac{1}{2}}\}$ Eq. (3)

On the other hand, Mahalanobis' distance is defined by:

$$M_k = (C - \mu_k)\Sigma_k^{-1}(C - \mu_k) \quad \text{Eq. (4)}$$

Eq. (4) may be simplified by making $\Sigma_k = \Sigma$, with $\Sigma_k$ being made common to all phonemes.

In this case, a linear discriminant function for discriminating phonemes k and k' is given by:

$$D^2 = M_k - M_{k'} = a^T C + b \quad \text{Eq. (5)}$$

wherein "a" is a linear discriminant coefficient vector, and "b" is a constant.

The vowel/nasal sound similarity calculator 12 calculates the degree of similarity and performs a similarity comparison for each of five vowels and nasal sounds by using one of Eqs. (2), (4) and (5).

Standard patterns of voiced sound feature and unvoiced sound feature are stored as standard patterns in memory 13a as (a) vowel/nasal, (b) sounds/voiced, and (c) sound feature/unvoiced sound so that the similarity calculation thereof is performed by the sililarity calculator 12 in the same manner as for vowels and nasal sounds. Furthermore, calculator 12 determines the voiced or unvoiced sound features of an input frame. The results of the similarity calculations are fed from calculator 12 to similarity buffer 14.

The standard patterns stored in memory 13 are determined in advance such that the average values and covariances are obtained for each phoneme by using many word data, having phoneme names that have been determined by eye measurement for each frame. After the data have been processed by step B, FIG. 2, the standard patterns are stored in the vowel/nasal, sound-/voiced, sound feature/unvoiced sound feature standard pattern memory 13.

The input speech signal is also fed to a segmentation parameter extractor 15 where it is frequency analyzed with a three-channel bandpass filter having low (250 to 600 Hz), middle (600 to 1,500 Hz) and high frequency (1,500 to 4,000 Hz) pass bands. Extractor 15 determines the high-frequency range power $P_H(j)$ and low-frequency range power $P_L(j)$ for every frame in logarithmic form as $LP_H(j)$ and $LP_L(j)$ as $LP(j) = 10 \cdot \log P(j)$. Extractor 15 smooths $LP_H(j)$ and $LP_L(j)$ in accordance with:

$$\overline{LP}(j) = \frac{LP(j-1) + 2LP(j) + LP(j+1)}{4}$$

The smoothed indications of the logarithms of low- and high-frequency power are supplied by extractor 15 to power information buffer 16.

Figure 3:
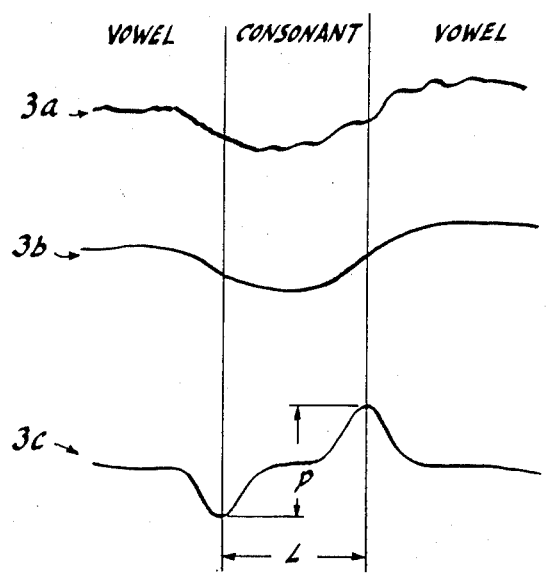
FIG. 3 is a series of waveforms useful in describing the method of detecting power dips from low-frequency range information or high-frequency range information.

The in-word consonant detecting function of the consonant segmenter 17 is now described. The term "in-word consonant" means consonants included in a word except for a consonant at the beginning of the word. FIG. 3 is a series of waveforms representing a way of extracting dips from the low- and high-frequency power signals stored in buffer 16. The operation illustrated in FIG. 3 is performed during steps D and E of the FIG. 2 flowchart.

Curve 3a in FIG. 3 results from plotting one of time series logarithms $LP_H$, $LP_L$ that represent the rectified output from a low pass or high pass filter. Curve 3a includes a number of small dips and large dips that represent consonant periods. Since the small dips are unnecessary for consonant determination, they are removed by smoothing to obtain curve 3b, that represents $LP_H$ or $LP_L$. Then difference values from curve 3b, FIG. 3, are determined during step E of FIG. 2 to obtain the signal of curve 3c which is expressed in terms of $DP_H$, $DP_L$ as:

$$DP(j) = \overline{LP}(J+1) - \overline{LP}(J-1)$$

From the signal of the curve 3c, the differences between the maximal values $DP(j2)$, $DP(j2')$ and minimal values $DP(j1)$, $DP(j1')$ are determined as $Ph = DPh(j2) - DPh(j1)$, $P_l = DP_l(j2') - DP_l(j1')$. Further, from curve 3c the time interval from the minimal value frame j1 to the maximal value frame j2 is determined as a function of the number of frames as $Lh = j2 - j1$, $L_l = j2' - j1'$. Then conditions of $P > P_{min}$, $L < L_{max}$ are applied to the dips to find the dips for satisfying these conditions. Also the curve 3c enables the period L to be determined from a maximal value and a minimal value (proposed consonant periods) as seen in a step F of FIG. 2. In the above, $P_{min}$ is a threshold for removing small magnitude dips, while $L_{max}$ is another threshold for removing an excessively long period, such as 150 msec.

This method is advantageous because dip periods can be simply detected with high accuracy by calculating maximum and minimum values of varying speed of power with the magnitude of power dips being replaced with the detection of varying speed of power.

Figure 4:
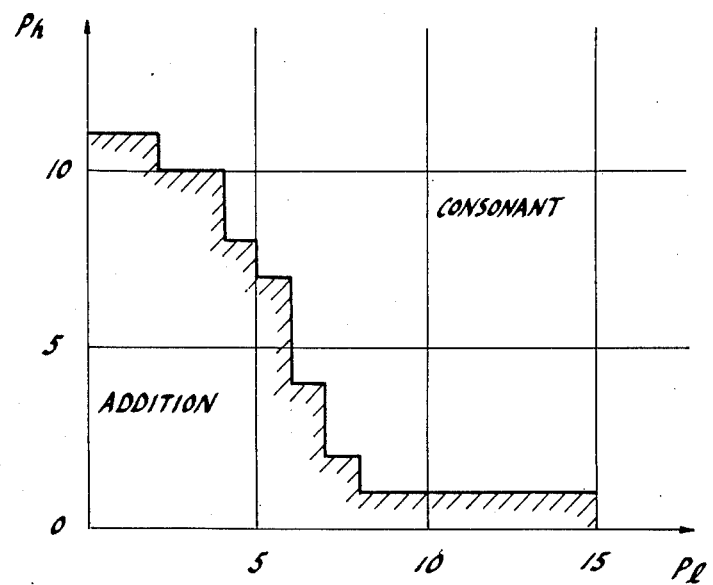
FIG. 4 is a discriminant diagram for determining consonant periods and addition of consonants by using the magnitude of low- and high-frequency range power dips.

The method of specifying a consonant period from proposed detected consonant periods is now considered for one or both of the low- and high-frequency power dips. When a proposed low-frequency consonant period overlaps a proposed high-frequency consonant period, a two-dimensional coordinate ($P_l$, $P_h$) is applied to discriminant diagram F, FIG. 4. As seen in a step G of FIG. 2, when ($P_l$, $P_h$) is positioned in an addition hatched area region, the consonant period is abandoned. When ($P_l$, $P_h$) is positioned in a consonant region, a period (IS1 to IE1) corresponding to logic OR of a low-frequency range power dip period and a high-frequency range power dip period is specified. When no overlap occurs between the low-frequency range information and the high-frequency range information, such information is applied to the discriminant diagram with one of them being set as 0, such as ($P_l$, 0).

The discriminant diagram is prepared such that steps D to F of FIG. 2 are performed in sequence by using a number of words with consonant periods that have been determined by eye measurement, to obtain the distribution of ($P_l$, $P_h$). From the distribution of ($P_l$, $P_h$) the consonant power dips and other power dips (addition) are satisfactorily classified in a desired manner.

The consonant periods are determined such that the low- and high-frequency power information pieces having complementary characteristics are used as parameters for finding proposed consonant periods for both frequency ranges. These information pieces are then applied to the discriminant diagram which is effective for a wide range of consonants, from voiced sounds to unvoiced sounds compared to conventional methods. The method is also advantageous because consonant periods can be detected with high accuracy. The method is especially effective for voiced consonants /b/, /d/, /ɟ/ /r/, unvoiced consonant /h/, and a consonant /z/ having both voiced and unvoiced sound features.

However, the above-described segmentation method, involving dip information, results in a detection rate of only 73% for nasal periods. The 73% detection rate is unsatisfactory for other voiced consonants. Furthermore, dip information cannot be used for syllabic nasal sounds in Japanese because the utterance time of such sounds is too long. This drawback is removed in one embodiment by a second consonant period detecting method using the continuity of frames which have been determined to be nasal sounds by the above-mentioned similarity calculator 12. When patterns of five vowels and nasal sounds are applied to all the frames, there is a high probability that respective frames corresponding to nasal sounds (/m/, /n/ and syllabic nasal in Japanese) will be recognized as nasal sounds, which are referred to as N hereinafter, while phonemes (/b/, /d/, /ɟ/, /r/) that have a spectrum pattern similar to those of nasal sounds are also recognized as N. Therefore, it is possible to detect voiced consonants even in periods where no dip exists if periods recognized as N are checked. In this embodiment, a period IS2 and IE2 is determined as a consonant period when five or more continuous frames have been recognized as a highest similarity phoneme or a second highest similarity phoneme.

The above-described segmentation method involving checking the continuity of frames which have been recognized as nasal sounds is effective for /m/, /n/, syllabic nasal in Japanese, /b/, /d/, /ɲ/.

A third consonant period detecting method using the determinations of voiced sound feature/unvoiced sound feature is now described. The duration of the last period of unvoiced consonants /s/, /c/, /h/ and /z/ is greater than Lmax, which sometimes prevents dips from being detected. In this case, segmentation is performed by continuing the determination of the voiced and unvoiced sound features with respect to time.

The voiced and unvoiced sound features are detected by using any one of: wave zero crossing, spectrum slope, or the value of a first degree self-correlation coefficient. In the embodiment of the present invention shown in step I of FIG. 2, LPC cepstrum coefficients $c_1$ to $c_5$ are used for calculating similarity $LU_k$, i.e. the distance between the standard patterns of voiced and unvoiced sound features by applying Mahalanobis' distance, as expressed in Eq. (4). Then the standard pattern having the highest similarity is written as $u^{(j)}$. Subsequently, as shown in step J of FIG. 2, if the above "u" represents an unvoiced sound feature in frames $j_1$ to $j_2$ and if seven or more unvoiced sound feature frames continue, such a period defined by frames $j_1$ to $j_2$ is segmented as a consonant period $IS_3$ to $IE_3$.

An example of the above-described first to third methods of consonant period detection is now described. While various combinations of the first through third consonant detection methods are possible, it is preferable to use a combination of: <1> the first consonant period detecting method using low- and high-frequency power information, <2> one or both of the second consonant period detecting methods using phoneme recognition for every frame, and <3> the third consonant period detecting method using the voiced-/unvoiced sound feature determination as seen in step K of FIG. 2.

In the embodiment of FIG. 2, the order of performing these first to third consonant period detecting methods is third, then first, and then second.

(i) Initially, the third method, <3>, is performed by determining if seven or more unvoiced feature frames continue; if so, the frames are determined as a consonant period.

(ii) the first method, <1>, performed for periods which were not detected as consonants during step <i>, involves detecting the occurrence of a consonant period by responding to dips.

(iii) The second method, <2>, is applied to a voiced sound period, and a period having five or more frames recognized as N continues, is determined as a consonant period.

(iv) All of the periods obtained by the above (i) to (iii) are determined as consonant periods. In the above, a period obtained by using dips is given priority in principle when a period is obtained in an overlapped manner by the above (i) and (ii) or by (ii) and (iii).

Although the above embodiment has been described for one or both of the second and third consonant period detecting methods combined with the first consonant detecting method, no problem would occur if only the first consonant detecting method were used.

The above description is directed to a method of segmenting in-word consonants; now consider the method of detecting consonants at the beginning of words.

Figures 5, 6, 7:
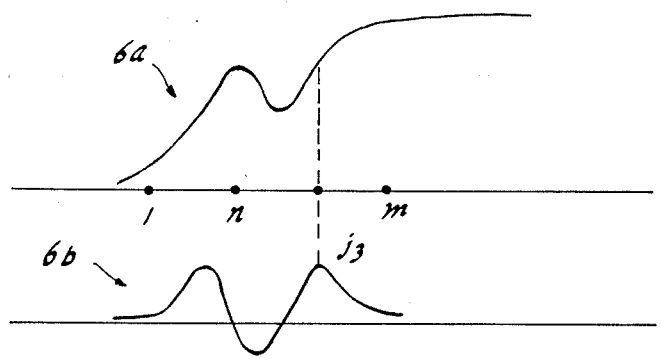
FIG. 5 is an explanatory diagram helpful in describing the method of detecting consonant periods by recognizing all frames as vowels or nasal sounds.
FIG. 6 is a series of waveforms useful in describing how power information is used for segmentation of a beginning consonant of a word.
FIG. 7 is a diagram of how an exemplary consonant is detected by using phoneme recognition.

The detecting method for the beginning consonant of a first word using low- and high-frequency powers is initially described. FIG. 6 includes exemplary waveforms of the power versus time variation of either the low or high-frequency power at the beginning of a word. When a word starts mainly with a plosive consonant, the smoothed power value ($\overline{LP}_H$, $\overline{LP}_L$) is shown by curve 6a, FIG. 6. The sudden variation of the curve 6a results from a sudden power increase in the plosive sound; the power value has a transient variation to a following vowel. Curve 6b represents the variation of difference values ($DP_H$, $DP_L$) of the time-dependent power variation of the curve 6a, per step E, FIG. 2.

During step L, FIG. 2, a maximal value $DP_H(j3)$ of $DP_H$ and a maximal value $DP_L(j3')$ of $DP_L$ are detected. When $n \leq j3 \leq m$, or $n \leq j3' \leq m$, a period from the beginning of a word (frame 1) to a frame $IH_1$ defined by max(j3, j3') is determined as the beginning consonant period of a word, wherein n and m are positive, threshold indicating thresholds. In the FIG. 2 embodiment, n=3, and m=10.

The above method is applied to low- and high-frequency power. If the low- or high-frequency power variation has a waveshape similar to that of curve 6a, the period is determined as a consonant period. This method is effective for any plosive sound since the unvoiced plosive sounds having the waveshape of curve 6a are apt to appear in the low-frequency range power and the voiced plosive sounds having the waveshape of curve 6a are apt to appear in high-frequency range power.

The second beginning consonant detecting method for a word, using the phoneme recognition results at every frame, is now described. The highest similarity phoneme strings $a^{(j)}$ and the second highest similarity phoneme strings $b^{(j)}$ detected during step c, FIG. 2 (in connection with vowels and nasal sounds), are used in step M to determine the period from the beginning of a word (frame 1) to a frame $IH_2$, i.e., the beginning period of a word, if either of $a^{(j)}$ or $b^{(j)}$ is a continuous nasal sound N from the beginning of the word to the frame $IH_2$, if $IH_2 \geq 5$.

In the example of FIG. 7, phonemes of an input sound /ma/ are recognized during every frame. Since N continues for five frames in a combination of the first proposed phoneme strings and the second proposed phoneme strings, a period from the first frame to the fifth frame is determined as the beginning consonant period of a word. This method is especially effective for phonemes /m/, /n/, /b/, /d/, /g/ and so on.

The third method for detecting a beginning consonant of a word, using the voiced sound feature/unvoiced sound feature determination, is now described. Unvoiced consonants at the beginning of a word are accurately segmented by using voiced sound feature-/unvoiced sound feature determination for the respective frames.

The voiced sound feature and unvoiced sound feature are determined by using one of (a) zero crossing wave, (b) spectrum slope and (c) first degree self-correlation coefficient values. The determination is carried out by comparing standard patterns for voiced sound feature and unvoiced sound feature with the detected speech, per step I, FIG. 2.

More specifically, as seen in step N, a consonant period 1 to $IH_3$ is detected when a predetermined number, such as four, of unvoiced feature frames continues from the beginning of a word. This method is effective for all unvoiced consonants.

Next a consonant period is determined for a phoneme (such as /z/) having first and second halves respectively containing voiced and unvoiced sound features if unvoiced frames follow voiced frames lasting from the beginning of a word within a predetermined period of time. For instance, when a frame /ZU/ is detected, the results of determination are /VVVVUUUVVVV/ wherein V and U respectively represent voiced and unvoiced frames. In this case, the entire period until the end of the last unvoiced frame is determined as the beginning consonant of a word.

In the embodiment of the present invention, the above-described first to third methods for detecting the beginning consonant of a word are applied in the following order.

*The second detection method using voiced sound feature/unvoiced sound feature determination for respective frames.

*The first detection method using the time-dependent low- and high-frequency power variations of the input speech spectrum.

*The third detection method using the phoneme recognition results for five vowels and nasal sounds for respective frames.

The above methods are performed in the stated order until a consonant is detected; then segmentation is performed by the first detection method. The remaining method or methods is/are not applied.

Although the first to third methods for detecting the beginning consonant of a word are applied in the prdetermined order in the embodiment, the present invention is not limited to such predetermined order. In other words, the three methods for detecting the beginning consonant of a word may be changed if desired as shown in step O, FIG. 2. Furthermore, only one of these three methods for detecting the beginning consonant of a word may be used to obtain a satisfactory result.

Figure 8:
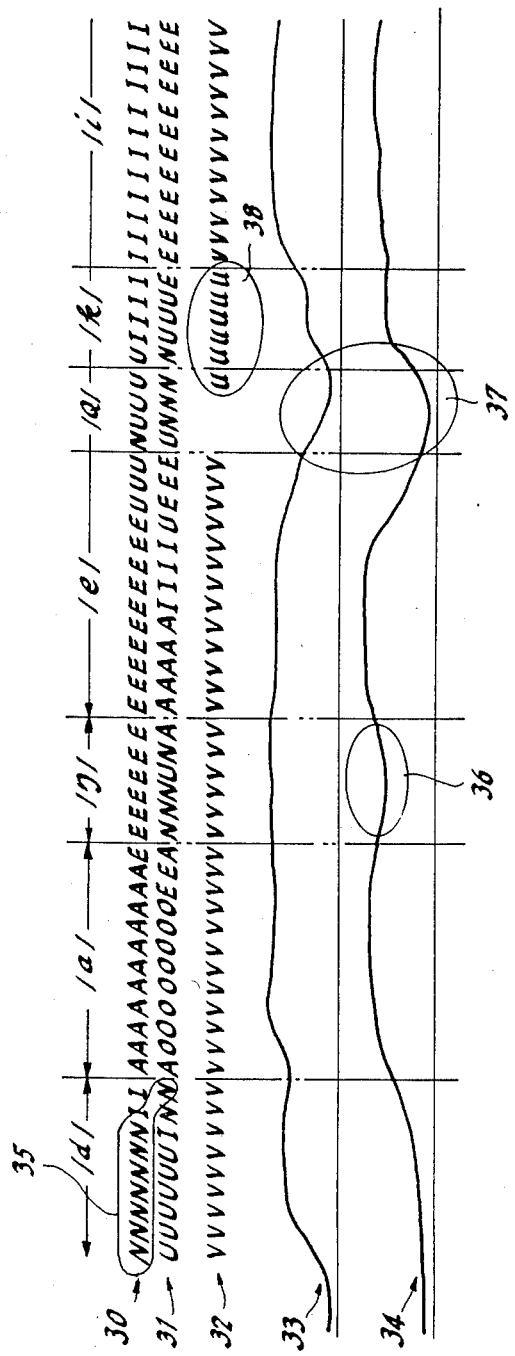
FIGS. 8 and 9 are diagrams useful for describing the segmentation method for several examples.
Figure 9:
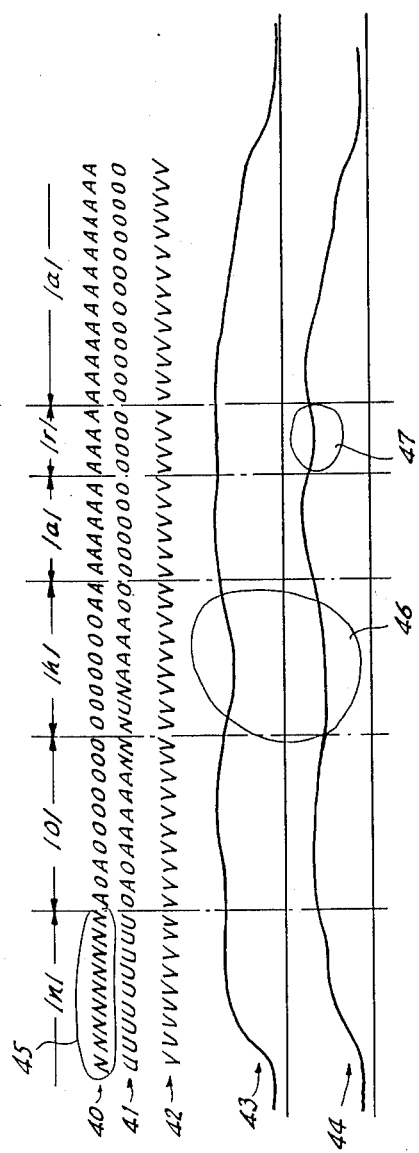

Examples of the above-described segmentations of in-word consonants and beginning consonants of a word are described in greater detail with reference to FIGS. 8 and 9. FIGS. 8 and 9 are diagrams of pronunciations of the Japanese words /daɔeki/ and /nohara/. In FIGS. 8 and 9, the reference numerals 30 and 40 indicate time series expressions of phonemes having the highest similarity as a result of vowel and nasal sound discrimination. The reference numerals 31 and 41 indicate time series expressions of phonemes having the second highest similarity. The reference numerals 32 and 42 indicate time series expressions of the result of voiced/unvoiced frame determination, wherein "V" and "U" respectively represent voiced and unvoiced frames. These results indicated by reference numerals 30 to 32 and 40 to 42 are equivalent to information stored in similarity buffer 14, FIG. 1.

Curves 33 and 43 are low-frequency power versus time variations, while curves 34 and 44 are high-frequency power versus time variations.

In FIG. 8, since the phoneme time series having the highest similarity with /d/ is a nasal sound "N", /d/ is segmented by regarding it as a consonant. In addition, phoneme /d/ can be detected by detecting the relatively low amplitude of the high-frequency range power information 34. The phoneme /ɔ/ can be detected by sensing dip 36 in high-frequency range power curve 34. However, phoneme /ɔ/ cannot be detected from any of: (a) the highest similarity phoneme time series 30, (b) the second highest similarity phoneme time series 31, or (c) the low-frequency range power curve 33. A silent phoneme /Q/ occurring before /k/ can be detected from dips 37 in the amplitudes of the low- and high-frequency power curves 33 and 34. The phoneme /k/ can be detected by dips in curves 33 and 34 and in response to unvoiced time frames 38 in voiced/unvoiced time frame series 32.

The beginning consonant /n/ of the word illustrated in FIG. 9 is detected by the fact that nasal sound frames continue as indicated by reference numeral 45 in highest similarity phoneme time series 40. The data in time series 40 are used because phoneme /n/ does not have distinguishing features in low- and high-frequency power curves 43 and 44. The phoneme /h/ is detected from dips 46 in the low- and high-frequency power curves 43 and 44. The phoneme /r/ is detected from dip 47 in high-frequency power curve 44.

As described in connection with examples of FIGS. 8 and 9, the consonants are segmented with high accuracy according to the present invention because the system uses several alternate detecting schemes, viz: the low- and high-frequency power curves, vowel and nasal sound time continuity discrimination, and voiced-/unvoiced frame determinations.

In this way, it is possible to determine consonant periods 1 to IH, IS to IE, IS' to IE', IS" to IE" ... during an overall sound period (frame 1 to frame J), step P of FIG. 2, by using the first to third methods of in-word consonant segmentation and the first to third segmentation methods for the beginning consonant of a word. However, there is a chance that one or both of the beginning consonants of the word and in-word consonant exist.

The operation of consonant similarity calculator 18, FIG. 1, is now described. The consonant similarity calculator 18 obtains the similarity $LC_k(j)$ of the phonemes, expressed in terms of k, by calculating the degree of similarity between input parameters fed from the input buffer 11 and consonant standard patterns stored in consonant standard pattern storing memory 19, by using one of the Eqs. (1), (2) and (3), for each consonant period detected by the consonant segmenter 17, step Q of FIG. 2. Then consonant recognizer 20 determines the phoneme in each consonant period, step R, as follows.

When a beginning consonant for a word occurs, a phoneme which maximizes:

$$L_k = \sum_{j=i}^{IH} LC_k(j)$$

is determined as a phoneme at the beginning of the word.

On the other hand, when an in-word consonant exists, a phoneme which maximizes:

$$L_k = \sum_{j=iS}^{IE} LC_k(j)$$

is determined as an in-word phoneme.

If plural in-word consonants exist, phonemes thereof are determined in a manner similar to the above.

The function of vowel recognizer 21, FIG. 1, is now described with reference to step S, FIG. 2. Each of the consonant periods removed during step P of FIG. 2, from the overall sound period (1 to J), is expressed by $V_1^{(m)}$ to $V_2^{(m)}$ wherein $m=1, 2, \ldots M$ (M is the number of periods). A semivowel pattern (including a contracted sound) in periods $V_1$ to $V_2$ is determined as a semivowel period having an assigned nomenclature of /j/ or /w/.

Examples of semivowel patterns are:
for /j/: IEAO, IEA, IEU etc.
for /w/: AOA, UOA, IUA, EUA etc.

The period $V_1$ to $V_2$ is divided into plural semivowel periods if there are periods each having four or more frames of the highest similarity phoneme $a^{(j)}$ continuing in one of the periods $V_1$ to $V_2$, from which semivowel periods have been removed. The phoneme nomenclature for each such division of the period $V_1$ to $V_2$ is determined. If $a^{(j)}$ does not continue for four or more frames, the most predominant phoneme nomenclature and the second highest similarity phoneme $b^{(j)}$ are determined.

Figure 10:
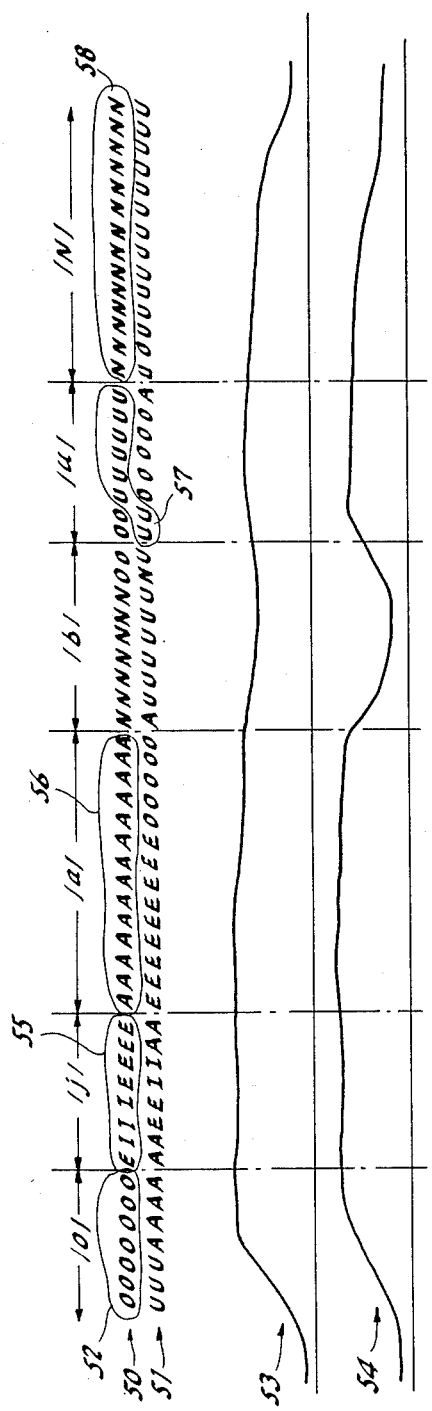
FIG. 10 is a diagram useful for describing the recognition method of vowels with reference to an example according to the present invention.

The operation of vowel recognizer 21, FIG. 1, is now described in detail with reference to FIG. 10 wherein phonemes are illustrated in the same form as in FIGS. 8 and 9 except that the voiced/unvoiced frame determinations have been omitted. In FIG. 10, a phoneme /o/ located at the beginning of a word is recognized from a continuous time series 50 of phonemes having the highest phoneme similarity. The semivowel phoneme /j/ 55 varies from I to E as seen from the highest similarity phoneme time series 50. Phoneme 55 is recognized as /j/ from series 50 since (a) the duration of each period in phoneme 55 is short and (b) the transition pattern from I to E in phoneme 55 is that of a typical /j/ pattern. The /a/ phoneme is recognized as such from the continuity of A during the highest similarity phoneme time series 50, indicated by reference numeral 56. Phoneme /u/ is recognized as /u/ by using both the highest phoneme similarity time series 50 and the second highest phoneme similarity time series 51 since "U" is predominant in series 50 while "O" and "U" are mixed in series 51, as indicated by reference numeral 57. A syllabic nasal in Japanese /N/ is also recognized from the highest phoneme similarity time series 50, as indicated by reference numeral 58.

The above-described method of semivowel recognition is now described in further detail. Some vowel patterns have an especially high repetition among vowel time series patterns. This phenomenon commonly occurs in vowel time series that occur around semivowel periods. It is used to recognize semivowels (including contracted sounds). The semivowel periods are extracted from a vowel time series produced in advance on the basis of spoken word data pronounced by a plurality of speakers. The extracted time series are stored in a proposed semivowel detecting vowel time series pattern memory in vowel recognizer 21.

Semivowels are detected as follows. The vowel time series fed from the similarity buffer 14 is compared one by one with vowel time series patterns stored in the proposed semivowel detecting vowel time series pattern memory, thus enabling matching to be determined. When matching is detected, the pattern duration and phoneme combination rule are considered to finally discriminate a semivowel and to segment.

The method of recognizing the exemplary semivowels /j/ and /w/ is now described with reference to FIGS. 11A and 11B. In FIG. 11A is illustrated the phoneme /rjo/ which has been extracted from the pronounced Japanese word /tesuurjoo/ (tesuryo). The reference numeral 23 indicates phoneme labels assigned in advance to the analyzing periods, while reference numeral 24 indicates the resulting, recognized consonants. In this example, a proposed period of a semivowel /j/ is detected from semivowel detecting vowel time series pattern "IEUO". Semivowel /j/ is detected by converting the input speech signal into the vowel time series 25. In this example, the phoneme corresponding to the pattern "IEU" is a proposed semivowel period, while a portion corresponding to "O" is the following vowel period. The semivowel /j/ is finally detected from time series 26 by considering that the duration of the following vowel period is equal to or greater than a threshold and that the proposed semivowel period is below the threshold.

In FIG. 11B, concerning the Japanese word /awa/, phoneme labels 27 are pre-assigned to respective analyzing periods, and the recognized consonants 28 are HHHHHHH. In this example, a proposed semivowel /w/ period is detected from the semivowel detecting vowel time series pattern "AOA" by using the results 29 obtained by converting the input speech signal into a time series of vowels. In this example, a proposed semivowel period corresponds to the pattern "O" which is preceded by vowel period A and followed by vowel period A. Since both the preceding and following vowel periods are equal to or greater than a threshold, and the proposed semivowel period is below a threshold, /awa/ is distinguished from /aoa/ including the pronunciation /aoao/, and the occurrence of the semivowel /w/ has been detected. Furthermore, when a consonant having no nasal sound features is recognized in a proposed semivowel period, a proposed semivowel period is determined by including a consonant period. If this period is below a threshold, and if this period is other than an unvoiced/silent period, priority is assigned to a semivowel so that the semivowel /w/ is recognized as indicated by reference numeral 70.

The phoneme string producing portion 22 of FIG. 1 produces phoneme strings by combining the consonant recognition results fed from the consonant recognizing portion 20 and the results of vowel recognition fed from the vowel recognizing portion 21, per step T of FIG. 2. The phoneme string producing portion 22 also corrects the results of phoneme discrimination by using Japanese pronunciation rules, such that when consonants other than the Japanese syllabic nasal are detected in sequence a vowel /i/ or /u/ should exist therebetween, or vowels /i/ and /u/ are apt to be unvoiced.

The phoneme strings produced in this way are compared with the contents of the word dictionary 9 by the word comparison/matching portion 8 to derive the dictionary word having the highest similarity to the phoneme strings. The comparison or matching method is described in detail in "SPOKEN WORD RECOGNITION SYSTEM FOR UNLIMITED SPEAKERS", by K. Kido, J. Miwa, Y. Niitsu, and S. Makino in IEEE Int. Conf. Acoustics, Speech and Signal Processing, Tulsa, pages 735-738 (published in April, 1978).

FIG. 12 is a functional block diagram of another embodiment of the present invention that provides fast speech recognition processing so that the apparatus is more practical. In the apparatus of FIG. 1, since the consonant similarity calculation is carried out after the consonant segmentation, a time lag is apt to occur, which requires input buffer 11. The embodiment of FIG. 12 provides faster processing by improving the FIG. 1 arrangement. Blocks in FIGS. 1 and 2 denoted by the same numerals have the same function.

Standard pattern memory 60 of FIG. 12 includes the vowel, nasal sound, voiced sound feature/unvoiced sound feature standard pattern memory 13 and the consonant standard pattern memory 19 of FIG. 1. Similarity calculator 61 calculates similarity to vowels, nasal sounds and voiced sound feature/unvoiced sound feature and consonants. The calculation results are stored in a similarity buffer. The consonant recognizer 20 recognizes consonants by using phoneme information determined as a consonant period among consonant similarity data from the similarity buffer 62 by the consonant segmentation portion 17. With this circuit arrangement, consonant recognition does not suffer from time lag so an excessive buffer is not needed, even though there are unnecessary calculations. Furthermore, since a portion of the complex similarity calculator 61 is common to the data stored in memories 13 and 19 (FIG. 1), the circuit arrangement of FIG. 12 is simple. Remaining portions of FIG. 12 are the same as those in FIG. 1.

The apparatus according to the present invention has the following advantages compared to conventional apparatus.

(1) Although an input speech signal is analyzed by way of a bandpass filter so as to extract a local peak which is used as a feature parameter in conventional arrangements, in the present invention LPC cepstrum coefficients and feature parameters are extracted by an LPC analyzer. Since LPC analysis is capable of removing glottal information including individual features from an input speech signal waveform, the apparatus and method accurately detect spoken words from unspecific speakers. In addition, because the glottal information is not considered, phoneme features are emphasized to obtain a high rate of phoneme recognition for each frame.

Moreover, while the local peak is a parameter mainly indicative of the formant of spoken sounds, LPC cepstrum coefficients are parameters indicative of an overall brief shape of a spectrum including the formant. Accordingly, the LPC cepstrum coefficients include greater amounts of information than the formants so that LPC cepstrum coefficients are useful for improving the recognition rate. LPC cepstrum coefficients are especially effective to distinguish between unvoiced consonants having an unclear formant structure.

(2) In the conventional apparatus, the method of applying the local peak to a discriminant diagram is used for discriminating a phoneme for each frame, whereas, in the present invention, pattern matching/comparison is performed between input LPC cepstrum coefficients and standard patterns by using a statistical distance measure, such as Mahalanobis' distance, Bayes' discriminant, linear discriminant function or the like. As a result, an average vowel recognition rate for each frame is 85.2% according to the present invention, in contrast to 78.4% in the conventional apparatus.

(3) In the conventional apparatus, the presence of a consonant is detected by using only segmentation parameters; therefore, voiced consonants, such as nasal sounds and /r/, sometimes could not be detected. On the contrary, according to the present invention in addition to segmentation parameters, results of phoneme recognition for respective frames effected for five vowels and nasal sounds (/m/, /n/, syllabic nasal in Japanese) as well as the results of determination of voiced sound feature/unvoiced sound feature for respective frames are jointly used. More specifically, a voiced consonant period is detected if the nasal sound frames continue during phoneme recognition. An unvoiced consonant period is detected if unvoiced frames continue while voiced sound feature/unvoiced sound feature is detected. With this operation, the consonant segmentation dropout rate can be remarkably reduced.

(4) The low- and high-frequency power information employed for segmentation provides greater segmentation reliability than the conventional method in which overall frequency range power and slope of spectrum are used.

(5) In a speech recognition experiment carried out for 200 names of cities spoken by each of 40 unspecific speakers of both sexes, a satisfactory recognition rate of 95% has been achieved by using the present invention, in contrast to an 88% average recognition rate using conventional methods. Furthermore, the present invention has been found suitable for recognition of spoken words from unspecific speakers because variation in recognition rate due to individual difference is small compared to the conventional methods. The reason for such suitability for recognition of speech from unspecific persons is that the similarity is calculated as statistical distance by using LPC cepstrum coefficients as feature parameters, and that segmentation accuracy is improved.

From the foregoing, in the present invention the phoneme recognition rate for respective frames is improved as a result of the average vowel recognition rate being improved, a reduced consonant segmentation dropout rate, the increased segmentation reliability and a high recognition rate for unspecific speakers, while attaining high speed recognition.

The above-described embodiments are just examples of the present invention, and, therefore, it will be apparent to those skilled in the art that many modifications and variations may be made without departing from the spirit of the present invention.

What is claimed is:
1. Apparatus for speech recognition, comprising:
(a) spectrum analyzer means for obtaining parameters indicative of the spectrum of an input speech signal, the spectrum analyzer means performing a linear prediction analysis of the input speech signal for obtaining a set of LPC cepstrum coefficients for the input speech signal
(b) a standard pattern storing means for storing phoneme standard patterns of phonemes or phoneme groups;
(c) a similarity calculating means for calculating the degree of similarity between the LPC cepstrum coefficients derived from said spectrum analyzer means and standard patterns stored in said standard pattern storing means, said calculating means determining a measure of the statistical distance between the LPC cepstrum coefficients and the standard patterns;
(d) a segmentation means for segmenting the input speech signal in response to the statistical distance measure derived by said similarity calculating portion and time-dependent power variations in low- and high-frequency ranges of the inout speech signal; and
(e) a phoneme discriminating means of recognizing phonemes in response to a signal derived by said similarity calculating means.

2. Apparatus as claimed in claim 1, wherein said statistical distance measure is selected from one of Bayes' discriminant function, Mahalanobis' distance function and the linear discriminant functions.

3. Apparatus for speech recognition, comprising:
   (a) a spectrum analyzer means for deriving spectrum information of an input speech signal, said spectrum information being a set of LPC cepstrum coefficients obtained by way of linear predictive analysis;
   (b) a first similarity calculating means for obtaining, by using a statistical distance measure, the degree of similarity of said input speech to phonemes of vowel features, voiced sounds and unvoiced sounds, said calculating means calculating the degree of similarity between the LPC spectrum coefficients derived from said spectrum analyzing means and standard patterns stored in a standard pattern storing means;
   (c) a first recognition means for segmenting and recognizing the input speech signal in response to a continuity of the statistical distance derived by said first similarity calculation means;
   (d) a segmentation parameter extracting means for deriving power information of low- and high-frequency ranges of said input speech signal;
   (e) a consonant segmentation means for segmenting consonant phonemes in response to signals representing the results of time-dependent variations of low- and high-frequency ranges of said power information in the input speech signal;
   (f) a second similarity calculation means for calculating, by using a statistical distance measure, the degree of similarity between coefficients derived from said spectrum analyzing means and standard phoneme patterns from said standard pattern storing portion of respective periods determined by said consonant segmentation portion;
   (g) a second recognition means for recognizing consonant phonemes in response to the degree of similarity determined by said second similarity means;
   (h) a phoneme string producing means for deriving phoneme strings in response to the degree of similarity determined by said first recognition means and the results from said second recognition portion; and
   (i) a matching means for comparison/matching the phoneme strings derived from said phoneme string producing means and dictionary items included in a word dictionary so as to derive a dictionary item having the highest similarity to said phoneme strings.

4. Apparatus as claimed in claim 3, wherein said spectrum information is derived by a linear predictive analayzer means or a bandpass filter bank.

5. Apparatus as claimed in claim 3, wherein said statistical distance measure is selected from one of Bayes' discriminant function, Mahalanobis' distance function and the linear discriminant functions.

6. Apparatus as claimed in claim 3, wherein said first similarity calculation means includes means for calculating a vowel similarity calculation and determining a voiced/unvoiced sound feature; said first recognizing means including means for recognizing vowels; said second similarity calculator including means for calculating the similarity of consonants; and said second recognition portion comprising means for recognizing consonants.

7. Apparatus as claimed in claim 3, wherein said standard pattern storing means stores predetermined standard patterns representing respective phonemes or phoneme groups in response to speech from plural speakers; said first similarity calculation means deriving a time series of phonemes having the highest similarity with feature parameters derived from said input speech signal being compared with said standard patterns; said consonant segmenting means detecting vowels at the beginning of words and consonants, a vowel period being detected by the segmenting means as a stable occurrence at the beginning of the input speech signal, a consonant period being detected by the segmenting means as a period while a vowel does not last or as a period while a nasal sound or unvoiced sound occurs.

8. Apparatus as claimed in claim 3, wherein said segmentation parameter extracting means derives power information for the low- and high-frequency ranges of the speech signal and for effecting speech segmentation, said consonant segmentation means detecting a proposed consonant period in response to dips in said power information and detecting a consonant period from said proposed consonant period.

9. Apparatus as claimed in claim 8, wherein said consonant segmentation means detects the proposed consonant period in response to maximal and minimal values in the rate of said time-dependent variation of said power information in the low- and high-frequency ranges, and the time between the occurrence points of said maximal and minimal values, said consonant segmentation means detecting a consonant period from said proposed consonant period in response to the difference between said maximal and minimal values of said power information of said low- and high-frequency ranges.

10. Apparatus as claimed in claim 9, wherein said consonant period is detected from said proposed consonant period by measuring the statistical distance between predetermined parameters of the speech signal and predetermined standard patterns, the predetermined parameters being indicative of the magnitude of dips of the power information of said low- and high-frequency ranges.

11. Apparatus as claimed in claim 9, wherein said consonant segmentation means detects said consonant period from said proposed consonant period in response to the magnitude of dips of the power information of said low- and high-frequency ranges being applied to a discriminant diagram.

12. Apparatus as claimed in claim 3, wherein said consonant segmentation means detects an in-word consonant period in response to one or more of:
   (a) the magnitude of power dips in time-dependent variations of said power information in said low- and high-frequency ranges of said inout speech signal;
   (b) said first recognition means recognizing all frames included in an overall sound period of the speech signal as vowels or nasal sounds, followed by a period in which at least a predetermined plural number of frames recognized as a nasal sound continue; and
   (c) said first similarity calculation means performing voiced/unvoiced frame determination for all frames included in an overall sound period of the speech signal while more than a predetermined number of unvoiced sound frames continue.

13. Apparatus as claimed in claim 3, wherein segmentation of a beginning consonant of a word performed by said consonant segmentation portion is in an arbitrary order of the following first to third methods such that when a consonant is detected by one or two of said first to third methods, the remaining method or methods is/are not applied, where:
the first method includes capturing time-dependent power variations in the low- and high-frequency ranges at the beginning of a word of said input speech signal;
the second method includes responding to the voiced/unvoiced frame determination detected by said first similarity calculation portion for respective frames of a sound period; and
the third method includes responding to five vowel and nasal sound frames detected by said first recognition means.

14. Apparatus as claimed in claim 3, wherein said first similarity calculation portion determines whether a sound has a voiced or unvoiced sound feature in response to a measure of the statistical distance between LPC cepstrum coefficients and two standard patterns, said LPC cepstrum coefficients being used as parameters indicative of the spectral shape of said input speech signal, said statistical distance measure being a measure of the similarity, with said said two standard patterns indicative of the shape of an average spectrum of voiced sounds and unvoiced sounds being stored in advance in said standard pattern storing means.

15. Apparatus as claimed in claim 14, wherein said statistical distance measure is selected from one of Bayes' discriminant function, Mahalanobis' distance function and a linear discriminant function.

16. Apparatus as claimed in claim 3, wherein portions of said first and second similarity calculation means are common to each other.

17. Apparatus as claimed in claim 1, wherein the phoneme discriminating means is responsive to a signal derived by said segmentation means.

18. A method of recognizing speech, comprising the steps of analyzing the spectral content of the speech by determining a set of linear predictive cepstrum coefficients obtained by performing a linear predictive analysis on the speech;
performing a statistical distance measure between the speech with phonemes of vowel features, voiced sounds and unvoiced sounds by calculating the degree of similarity between the LPC cepstrum coefficients and stored standard patterns;
segmenting and recognizing the speech in response to a continuity of the statistical distance determined during the immediately preceding step;
extracting parameter segments of the input speech by deriving power information of low- and high-frequency ranges of the speech;
segmenting consonant phonemes of the speech in response to the statistical distance similarity calculation and time-dependent variations of low- and high-frequency ranges of the power information in the speech;
calculating the degree of similarity between coefficients derived from the spectral analysis and stored standard consonant phoneme patterns;
recognizing consonant phonemes in response to the degree of similarity determined during the immediately preceding step;
deriving phoneme strings in response to the degree of similarity determined by both of the similarity calculations; and
comparing/matching the phoneme strings derived from the phoneme strings and dictionary items to derive a dictionary item having the greatest similarity with the phoneme strings.

19. The method of claim 18, wherein data are derived from the speech of plural speakers to derive the predetermined standard patterns representing phonemes or phoneme groups,
the consonants being segmented by detecting vowels at the beginning of words and consonants, detecting a vowel period as a stable occurrence at the beginning of the input speech signal, detecting a consonant period as a period while a vowel does not last or as a period while a nasal sound or unvoiced sound occurs.

20. The method of claim 18, wherein the extracted parameter is segmented by:
responding to power information for the low- and high-frequency ranges of the speech signal and for segmenting the speech;
detecting the consonant segments by detecting a proposed consonant period in response to dips in the power information; and
detecting a consonant period from the proposed consonant period.

21. The method of claim 20, wherein the consonant is segmented by:
detecting the proposed consonant period in response to maximal and minimal values in the rate of the time-dependent variation of the power information in the low-and high-frequency ranges and the time between occurrence points of the maximum and minimum values; and
detecting a consonant period from the proposed consonant period by determining the difference between the maximum and minimum values of the power information of the low- and high-frequency ranges.

22. The method of claim 21, wherein the consonant period is detected from the proposed consonant period by measuring the statistical distance between predetermined patterns of the speech and predetermined standard patterns, the predetermined parameters being indicative of the number of dips of the power information of the low- and high-frequency ranges.

23. The method of claim 21, wherein the consonants are segmented by detecting the consonant periods from the proposed consonant periods in response to the magnitude of dips of the power information of the low- and high-frequency ranges, as applied to a discriminant diagram.

24. The method of claim 18, wherein the consonant is segmented by detecting an in-word consonant period in response to one or more of:
the magnitude of power dips in time-dependent variations of power information in the low- and high-frequency ranges of the speech;
recognizing all frames included in an overall sound period of the speech signal as vowels or nasal sounds, followed by a period during which at least a predetermined plural number of frames are continuously recognized as nasal sounds by the segmenting and recognizing step responsive to the continuity of the statistical distance between the input speech and phonemes of vowel features, voiced sounds and unvoiced sounds;

detection of voiced/unvoiced frames during an overall sound period of the speech signal while more than a predetermined number of unvoiced frames continue.

25. The method of claim 18, wherein beginning consonants of a word are segmented in an arbitrary order of the following first to third steps such that a consonant is detected by one or two of the first to third steps and the remaining step or steps are not performed, where the steps are:

first capturing time-dependent power variations in the low- and high-frequency ranges at the beginning of a word of the speech;

the second step includes responding to the voiced-/unvoiced frame determination resulting from the degree of similarity of the speech to phonemes of vowel features, voiced sounds and unvoiced sounds; and the third step including responding to five vowel and nasal sound frames detected by determining the statistical difference between the speech and phonemes of vowel features, voiced sound and unvoiced sounds.

26. The method of claim 18, wherein the degree of similarity of the speech to phonemes of vowel features, voiced sounds and unvoiced sounds determines whether a sound has voiced or unvoiced sound features in response to a measure of the statistical difference between LPC cepstrum coefficients and two standard patterns, the LPC cepstrum coefficients being used as parameters indicative of the spectral shape of the speech, the statistical distance measure being a measure of the similarity, two standard patterns indicative of the shape of an average spectrum of voiced sounds and unvoiced sounds being stored to enable the statistical distance measurement to be performed.

* * * * *